United States Patent Office 3,819,707
Patented June 25, 1974

3,819,707
4-(AMINOALKYLAMINO)-2-HALOBENZYL
ALCOHOLS
Sydney Archer, Bethlehem and David Rosi, East Greenbush, N.Y., assignors to Sterling Drug Inc., New York, N.Y.
No Drawing. Continuation-in-part of Ser. No. 42,876, June 2, 1970, which is a continuation-in-part of Ser. No. 664,628, Aug. 31, 1967, now Patent No. 3,558,629, Jan. 26, 1971, which is a continuation-in-part of Ser. No. 444,848, Apr. 1, 1965, now Patent No. 3,379,620, Apr. 23, 1968. This application Jan. 26, 1972, Ser. No. 221,047
Int. Cl. C07c 87/48
U.S. Cl. 260—570.5 P                    5 Claims

ABSTRACT OF THE DISCLOSURE

4-[Amino-(polycarbon - lower-alkyl)-amino]-2-halobenzyl alcohols and lower-alkyl ethers thereof have schistosomacidal activity. The benzyl alcohols are prepared: by reduction of the corresponding benzaldehydes or lower-alkyl benzoates; by microbiological oxidation of the corresponding 4-substituted-amino-2-halotoluenes; or, for the compounds where polycarbon-lower-alkyl is ethylene, by reducing the corresponding lower-alkyl 4-(aminoacetylamino)-2-halobenzoates or by reducing the corresponding 4-(aminoacetylamino) - 2 - halobenzyl alcohols. The ethers are prepared by heating the benzyl alcohols with a lower-alkanol in the presence of an acid.

---

This application is a continuation-in-part of our copending application Ser. No. 42,876, filed June 2, 1970 and now U.S. Pat. 3,714,167, issued January 30, 1973, which in turn is a continuation-in-part of our application Ser. No. 664,628, filed Aug. 31, 1967 and now U.S. Pat. 3,558,629, issued Jan. 26, 1971, which in turn is a continuation-in-part of our application Ser. No. 444,848, filed Apr. 1, 1965, now U.S. Pat. 3,379,620, issued Apr. 23, 1968.

This invention relates to 4-aminobenzyl alcohol derivatives and to processes for their preparation.

The invention sought to be patented, in its composition aspect, resides in the class of compounds which we designate 4-[amino-(polycarbon-lower-alkyl)-amino]-2-halobenzyl alcohols and lower-alkyl ethers thereof. The tangible embodiments of this composition aspect of the invention possess the inherent applied use characteristics of having schistosomacidal properties, as determined by standard chemotherapeutic evaluation procedures.

Said application Ser. No. 444,848, now U.S. Pat. 3,379,620, discloses and claims the process for producing a 4-[amino-(polycarbon-lower - alkyl)-amino]-2-halobenzyl alcohol which comprises subjecting a 4-[amino-(polycarbon-lower-alkyl)-amino]-2-halotoluene to the fermentative enzymatic action of an organism capable of effecting oxidation of the 1-methyl group to 1-hydroxymethyl, said organism classified in the orders *Moniliales, Mucorales, Sphaeriaeles, Sphaeropsidales, Melanconiales* and *Actinomycetales*. We have found variations exist in the efficiency of different genera and species of organisms within the above orders in our oxidative process and have therefore ascertained that, by following the screening procedure hereinafter described, the effectiveness of any particular organism can readily be determined.

Another process of preparing said 4-[amino-(polycarbon-lower-alkyl)-amino]-2-halobenzyl alcohol comprises reacting a 4-[amino-(polycarbon-lower-alkyl)-amino]-2-halobenzaldehyde or lower-alkyl 4-[amino-(polycarbon-lower-alkyl)-amino]-2-halobenzoate with a reducing agent effective to reduce, respectively, benzaldehydes or lower-alkyl benzoates to benzyl alcohols.

Said application Ser. No. 664,628, now U.S. Pat. 3,558,629, discloses and claims the intermediate 4-(1-piperazinyl)-2-halobenzaldehydes which are prepared by reacting a 3-(1-piperazinyl) - halobenzene with an N—R'—N—R''— formamide, where R' is lower-alkyl and R'' is lower-alkyl or phenyl, in the presence of phosphorus oxyhalide.

Well known as schistosomacidal agents are a wide variety of 4-[amino-(polycarbon-lower-alkyl)-amino]-2-halotoluenes which differ from our 4-[amino-(polycarbon-lower-alkyl)-amino]-2-halobenzyl alcohols or ethers in having methyl instead of hydroxymethyl or alkoxymethyl as a substituent on the benzene ring ortho to halo and para to the aminoalkylamino substituent. The "amino-(polycarbon-lower-alkyl)-amino" substituent of these known 4-[amino-(polycarbon-lower-alkyl) - amino]-2-halotoluenes varies widely; for example, in some compounds the two amino groups are connected by alkylene having a chain of two to six carbon atoms inclusive, optionally substituted by lower-alkyl, and having its connecting linkages on different carbon atoms, with the terminal amino being primary, secondary or tertiary, and the other amino (directly connected to the benzene ring) bearing hydrogen or lower-alkyl; in other compounds the two amino groups are part of a piperazino ring, with the terminal amino (i.e., the 4-ring nitrogen of piperazino) being unsubstituted or bearing various substituents, e.g., lower-alkyl, lower-alkenyl, lower-hydroxyalkyl, phenyl-(lower-alkyl), carbamyl, thiocarbamyl, lower-carbalkoxy, carboxy-(lower-alkanoyl), carboxy-(lower-alkenoyl), etc. Also, these compounds can bear other low-molecular substituents, e.g., lower-alkyl, at one or more of the remaining three available ring positions, i.e., 3, 5 and/or 6. One of the best known and most active of these 4-(aminoalkylamino)-2-halotoluenes is 2-chloro-4-(2-diethylaminoethylamino)toluene, preferably named as 3-chloro-N-(2-diethylaminoethyl)-4-methylaniline and perhaps better known as "Mirasan"; other highly active and preferred members of this known class of compounds are 1-(3-chloro-4-methylphenyl)piperazine [same as 2-chloro-4-(1-piperazinyl)toluene], 1-(3-chloro-4-methylphenyl)-4-methylpiperazine, maleic acid mono-4-(3-chloro-4-methyl)piperazide and 2-chloro-4-<4-[6-(4-tertiary-amylphenoxy)hexyl]-1-piperazinyl>-toluene. All of these and other heretofore known compounds having high schistosomacidal activity required the presence of the methyl substituent on the benzene ring, as well as the halo and amino-(polycarbon-lower-alkyl)-amino substituents at ortho and para positions, respectively. Workers in the field have reported that the methyl group cannot be replaced by another radical without losing the schistosomacidal activity.

We have now found that compounds of this type where the ring methyl substituent is replaced by hydroxymethyl, i.e., 4 - [amino-(polycarbon-lower-alkyl)-amino]-2-halobenzyl alcohols, or by lower-alkoxymethyl not only have high schistosomacidal activity but also are more active as schistosomacidal agents in hamsters and less toxic than the corresponding methyl compounds.

Without limiting the generality of the foregoing, illustrative and preferred embodiments of our 4-[amino-(polycarbon-lower-alkyl)-amino]-2 - halobenzyl alcohols and lower-alkyl ethers are those of formula I

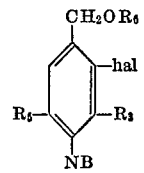

where hal is halo, i.e., chloro, bromo, iodo or fluoro; $R_3$, $R_5$ and $R_6$ are each hydrogen or lower-alkyl; NB is $$N(R)—Y—NR_1R_2$$

or

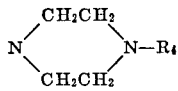

R is hydrogen or lower-alkyl; Y is polycarbon-lower-alkylene; $R_1$ and $R_2$ are each hydrogen or lower-alkyl, lower-alkenyl or lower-hydroxy-alkyl and can be the same or different; $R_1$ and $R_2$ taken with N also comprehend saturated N-heteromonocyclic radicals having from five to six ring atoms, illustrated by piperidino, pyrrolidino, morpholino, piperazino, hexamethyleneimino and lower-alkylated derivatives thereof; and, $R_4$ is hydrogen, lower-alkyl, lower alkenyl, lower - hydroxyalkyl, carbamyl, thiocarbamyl, lower-alkanoyl, lower-carbalkoxy, carboxy-(lower-alkanyoyl), carboxy-(lower-alkenoyl) or phenyl-X-(lower-alkyl), where X is oxygen or a direct linkage, Here and elsewhere throughout this specification, it will be understood that the benzene ring of phenyl can bear any number and kind of substituents such as would occur to the man skilled in organic chemistry, e.g., such substituents, solely for illustration and without limitation, including lower-alkyl, lower-alkoxy, halo (chloro, bromo, iodo or fluoro), nitro, lower-alkylmercapto, lower-alkanoylamino, lower - alkanoyloxy, lower - alkylamino, lower-alkenyl, and the like.

The compound of formula I wherein NB is

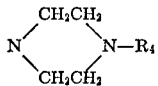

are disclosed and claimed in said copending application Ser. No. 42,876.

The above terms, as used throughout this specification, have the following meanings, each of which are illustrated but wihout limiting their generality: "lower-alkyl" means alkyl radicals having from one to six carbon atoms which can be arranged as straight or branched chains, e.g., methyl, ethyl, n-propyl, isopropyl, n-butyl, 2-butyl, iso-butyl and n-hexyl; "polycarbon-lower-alkylene" means alkylene radicals having from two to six carbon atoms inclusive and having its connecting linkages on different carbon atoms, e.g.

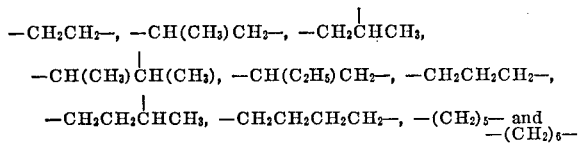

"lower-alkenyl" means alkenyl radicals having from three to six carbon atoms, e.g., 2-propenyl (allyl), 2-methyl-2-propenyl, 2-butenyl, 3-butenyl and 2-hexenyl; "lower-hydroxyalkyl" means heydroxyalkyl radicals having from two to six carbon atoms and having its connecting linkage and the hydroxyl group on different carbon atoms, e.g., 2-hydroxyethyl, 2-hydroxypropyl, 3-hydroxypropyl, 2-hydroxy-2-methylpropyl, 4-hydroxybutyl, 2-hydroxy-2,2-dimethylpropyl and 6-hydroxyhexyl; "lower-carbalkoxy" means carbalkoxy radicals where the alkoxy portion can be straight- or branch-chained and has from one to six carbonatoms, e.g., carbomethoxy, carbethoxy, carbo-n-propoxy, carbisopropoxy, carbo-n-butoxy and carbo-n-hexoxy; "lower-alkanoyl" means alkanoyl radicals having from one to six carbon atoms which can be arranged as straight or branched chains, e.g., formyl, acetyl, propionyl (n-propanoyl), isobutyryl (2 - methoxy-n-propanoyl) and caproyl (n-hexanoyl); "lower-alkenoyl" means alkenoyl radicals having from three to six carbon atoms, e.g., 2-propenoyl, 2-methyl-2-propenoyl, 2-butenoyl, 3-butenoyl and 2-hexenoyl. When $NR_1R_2$ of formula I or II (below) comprehends saturated (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6 - dimethylpiperidino, 2,4-dimethylpiperidino, 2,4,6-trimethylpiperidino, 3-n-propylpiperidino, 2,2 - dimethylpiperidino, 2-methylpyrrolidino, 2,5-dimethylpyrrolidino, 2,3-dimethylmorpholino, 2-ethylmorpholino, 2-methylhexamethyleneimino, 2,7-dimethylhexamethyleneimino, 4-methylpiperazino, 3-ethylpiperazino, 2,4,6-trimethylpiperazino, and the like.

The 4-[amino-(polycarbon-lower-alkyl)-amino]-2-halobenzyl alcohols and ethers of our invention are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic doses of the salts, so that the beneficial properties inherent in the free base are not vitiated by side effects ascribable to the anions; in other words, the latter do not substantially affect the chemotherapeutic properties inherent in the cations. In practicing our invention, we found it convenient to employ the hydrochloride or p-toluenesulfonate salt. However, other appropriate chemotherapeutically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, quinic acid, 3-hydroxy-2-naphthoic acid, pamoic acid (2,2'-dihydroxy-1,1'-dinaphthyl-methane-3,3'-dicarboxylic acid), naponic acid (1,5-naphthalenedisulfonic acid), and the like, giving the hydrobromide, hydriodide, nitrate, phosphate, sulfamate, sulfate, acetate, citrate, tartrate, lactate, methanesulfonate, ethanesulfonate, benzenesulfonate, quinate, 3 - hydroxy-2-naphthoate, pamoate and naponate, respectively.

The acid-addition salts are prepared preferably by reacting the free base and acid in an organic solvent, e.g., ethanol, acetone, etc., in which case the salt separates directly or can be obtained by concentration of the solution.

Although chemotherapeutically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

Also encompassed by our invention are simple esters of our 4-[amino-(polycarbon-lower-alkyl)-amino]-2-halobenzyl alcohols, for example, lower alkanoates (e.g., acetate, propionate and butyrate), phenylcarboxylates (e.g., benzoate, 3,5-dinitrobenzoate and 4-ethoxybenzoate) and carbanilates. These esters are prepared by known means and are useful to further characterize and identify our substituted-benzyl alcohols.

The molecular structures of the 4-[amino-(polycarbon-lower-alkyl)-amino]-2-halobenzyl alcohols of our invention were assigned on the basis of evidence provided by infrared, ultraviolet and nuclear magnetic resonance spectra, by chromatograph mobilities, and by the correspondence of calculated and found values for the elementary analyses for representative examples.

The manner of making and using our invention will now be generally described so as to enable the person skilled in the art of organic chemistry to make and use the same.

FINAL PRODUCTS FROM CORRESPONDING BENZALDEHYDES OR LOWER-ALKYL BENZOATES

This process utilizes as intermediates 4-[amino-(polycarbon-lower-alkyl) - amino] - 2 - halobenzaldehydes or lower-alkyl 4-[amino-(polycarbon-lower-alkyl)-amino]-2-halobenzoates, which are prepared by generally known procedures illustrated in the specific exemplary disclosure below or, in the case of the 4-aminoalkylamino-2-halobenzaldehydes, by another process hereinbelow described. The process comprises reacting the 4-aminoalkylamino-2-halobenzaldehyde or lower-alkyl 4-aminoalkylamino-2-halobenzoate with a reducing agent effective to reduce benzaldehydes or lower-alkyl benzoates, respectively, to benzyl alcohols. The reduction can be carried out both by catalytic hydrogenation and by chemical methods. Catalysts suitable when catalytic hydrogenation is used include Raney nickel, platinum or palladium. Suitable chemical reducing agents include: alkali aluminum hydrides, e.g., lithium aluminum hydride; alkali borohydrides, e.g., sodium borohydride; an alkali metal and a lower alkanol, e.g., sodium and ethanol. Also, the benzaldehydes can be reduced to the benzyl alcohols using iron and acetic acid or isopropyl alcohol and aluminum isopropoxide. In practicing our invention, we preferably used lithium aluminum hydride in ether or tetrahydrofuran in reducing the benzaldehydes and sodium borohydride in a lower alkanol, e.g., ethanol or methanol, with or without water, in reducing the lower-alkyl benzoates.

A modification of this process comprises reacting a lower-alkyl 4 - aminoacetylamino - 2 - halobenzoate, e.g., without limiting the generality of the foregoing, a lower-alkyl 4-aminoacetylamino - 2 - halobenzoate of the formula II

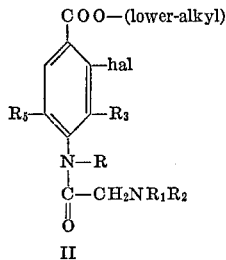

II where hal, R, $R_1$, $R_2$, $R_3$ and $R_5$ have the meanings given above for formula I, with a reducing agent effective to reduce lower-alkyl benzoates to benzyl alcohols and aminoacetamides to aminoethylamines. Suitable reducing agents are those given above for the reduction of lower-alkyl benzoates to benzyl alcohols. We preferably used an alkali aluminum hydride, e.g., lithium aluminum hydride in an inert solvent, e.g., tetrahydrofuran, in the presence of a suitable catalyst, e.g., aluminum trichloride; best results were obtained using lithium aluminum hydride, tetrahydrofuran and aluminum chloride, and keeping the reaction temperature below 0° C., preferably between —15° C. and —5° C. Alternatively, the same reduction can be carried out but using instead of the benzoates of formula II the corresponding benzyl alcohols, i.e., CH₂OH in place of COO-(loweralkyl). These intermediate 4-aminoacetylamino-2-halobenzyl alcohols, which also are useful as local anesthetic agents, as determined by standard pharmacological evaluation procedures, can be prepared from the corresponding 4-aminoacetylamino-2-halotoluenes by using our microbiological oxidative procedure described hereinabove. The intermediate 4-aminoacetylamino-2-halotoluenes are conveniently prepared in two generally known steps from the corresponding known 4-amino-2-halotoluenes, that is, by first reacting a 4-amino-2-halotoluene with chloroacetyl chloride to form a 4-(chloroacetylamino)-2-halotoluene which is then reacted with ammonia or appropriate amine of the formula $HNR_1R_2$ ($R_1$ and $R_2$ defined above) to yield the 4-($R_1R_2$N-acetylamino)-2-halotoluene.

The lower-alkyl ethers of our benzyl alcohols, i.e., the compounds of formula I where $R_6$ is lower-alkyl, are prepared by heating the benzyl alcohol (formula I where $R_6$ is hydrogen) with the appropriate lower-alkanol in the presence of an acid, preferably a strong acid. This reaction is conveniently carried out by heating the basic benzyl alcohol as its acid-addition salt, e.g., di(p-toluenesulfonate), in the lower-alkanol at its boiling point to dissolve the benzyl alcohol salt and allowing the resulting solution to cool whereupon the basic lower-alkyl ether separates as its acid-addition salt.

The foregoing discussion is offered to illustrate the various aspects of our invention and not to limit its scope. Our invention is further illustrated by the following examples.

Example 1

Fermentative enzymatic oxidation of 2-chloro-4-(1-piperazinyl)toluene to 2-chloro-4-(1-piperazinyl)-benzyl alcohol was accomplished as follows: Four 10 liter fermentations employing *Aspergillus sclerotiorum* (SWRI A₂₄, available at Sterling-Winthrop Research Institute, Rensselaer, New York) in sterile soy-dextrose medium of the following composition were carried out.

| | | |
|---|---|---|
| Dextrose | g | 1000 |
| Soybean meal | g | 150 |
| Yeast | g | 50 |
| NaCl | g | 50 |
| MgSO₄.nH₂O | g | 2.5 |
| NaH₂PO₄.H₂O | g | 13.8 |
| Na₂HPO₄.12H₂O | g | 301 |
| Tap water | liters | 9.5 | pH adjusted to 7.3 with 10N HCl; autoclave at 120° C. and 15 p.s.i. for 15 minutes.

The stock culture was initially grown at 26° C. on slants in a nutrient medium (e.g., maltose, 40 g./liter, and Proteose Peptone No. 10 g./liter) in 22 x 175 mm. tubes for ten to fourteen days. These slants were used to prepare seed for the 10-liter fermenters as follows: Sterile distilled water (10 ml.) was added to a slant and the spores and some vegetation growth were scrapped with a sterile hooked needle. The resulting suspension was added to a two liter flask containing 700 ml. of sterile soy-dextrose medium of the following composition:

| | | |
|---|---|---|
| Soybean meal | g | 15 |
| Dextrose | g | 20 |
| Yeast | g | 5 |
| NaCl | g | 5 |
| K₂HPO₄ | g | 5 |
| Tap water | liter | 1 | pH adjusted to 6.4 with 10N HCl prior to autoclaving at 121° C. and 15 p.s.i. for 15 minutes.

These cotton plugged flasks were incubated at 26° C. for approximately seventy hours on a rotary shaker with a one-inch throw at 240 r.p.m. Each flask provided seed for one 10-liter fermenter. The fermentations were carried out at 28° C. in a water bath with an air flow of 5 liters per minute and were agitated at 450 r.p.m. After an initial twenty-four hours' growth, the substrate, 2-chloro-4-(1-piperazinyl)toluene as its hydrochloride salts, 212 g. (53 g. to each fermenter), was added in portions (5–10 g.) over a period of five days. The tanks were assayed for 2-chloro-4-(1-piperazinyl)benzyl alcohol content periodically as follows: Samples from each fermenter were made basic with 0.2 ml. of 10N sodium hydroxide solution and extracted with methylene dichloride. The extracts were evaporated to dryness and the residues dissolved in 3 ml. of methylene dichloride. Aliquots (20 ul.) were transferred to thin-layer silica gel plates impregnated with 1% of a phosphor (e.g., Radelin GS–115). The plates were developed in a solevnt containing 8:1:1 parts by volume of $CH_2Cl_2$:$CH_3OH$:$N(C_2H_5)_3$. The components were viewed as blue spots on a yellow fluorescent background. Under these conditions, the $R_f$ value of the intermediate toluene derivative was 0.46 and that of the corresponding benzyl alcohol was 0.36.

Isolation.—The fermentations were terminated by the addition of 130 ml. of 10N NaOH and each tank was extracted with methylene dichloride (2×20 liters). The extracts were reduced under vacuum and combined. Further reduction in volume resulted in a yellow crystalline precipitate weighing 150 g. Thin layer chromatography of this material showed traces of 2-chloro-4-(1-piperazinyl) toluene with the major component chromatographically identical with a sample of 2-chloro-4-(1-piperazinyl)benzyl alcohol prepared by reduction of the corresponding 2-chloro-4-(1-piperazinyl)benzaldehyde Example 10D), U.S. Pat. 3,379,620).

Purification—The material was recrystallized from ethyl acetate (about 800 ml.). An insoluble fraction (4.5 g.) was filtered off; this material was probably a salt of the product since in the above basic TLC system it behaved like 2-chloro-4-(1-piperazinyl)benzyl alcohol. On cooling the filtrate in an ice bath, 120 g. of cream-colored crystalline 2-chloro-4-(1-piperazinyl)benzyl alcohol, m.p. 120–122° C. (corr.), was obtained. A second crop of 23.5 g. was obtained from the mother liquor.

Analysis.—Calcd. for $C_{11}H_{15}ClN_2O$: N, 12.36; Cl, 15.64. Found: N, 12.43; Cl, 15.44.

Infrared, ultraviolet and nuclear magnetic resonance spectral data of the above product show it to be identical with the product obtained chemically by reduction of the corresponding 2-chloro-4-(1-piperazinyl)benzaldehyde.

Example 2

Fermentative enzymatic oxidation of 2-chloro-4-(2-diethylaminoethylamino)toluene to 2-chloro-4-(2-diethylaminoethylamino)benzyl alcohol was carried out following the procedure described in Example 1, using one 10-liter fermenter, Aspergillus sclerotiorum (SWRI A$_{24}$), a sterile soy-dextrose medium of the following composition:

| | |
|---|---|
| Dextrose _____g__ | 800 |
| Soybean meal _____g__ | 150 |
| Yeast _____g__ | 50 |
| NaCl _____g__ | 50 |
| $MgSO_4.7H_2O$ _____g__ | 2 |
| $Na_2HPO_4.7H_2O$ _____g__ | 193 |
| $NaH_2PO_4.H_2O$ _____g__ | 40 |
| Tap water _____liters__ | 9.5 | pH of about 7 prior to autoclaving at 120° C. and 15 lbs. p.s.i. for 15 minutes.

161 g. of 2-chloro-4-(2-diethylaminoethylamine)toluene hydrochloride added in 3–15 g. portions over a period of eight days, a conversion temperature of 29–30° C., an aeration rate of 5 liters/minute, an agitation rate of 450 r.p.m., 150 ml. of 10N sodium hydroxide solution to terminate the fermentation, and two 20 liter portions of methylene dichloride to extract the product. A TLC on the extract showed good conversion to the corresponding benzyl alcohol, along with some of the corresponding 2-chloro - 4 - (2 - diethylaminoethylamine)benzaldehyde, as shown by spraying the TLC plate with 2,4-dinitrophenylhydrazine. The methylene dichloride extract was concentrated in vauco to an oil residue which was taken up with 200 ml. of anhydrous methanol. To this solution was added sodium borohydride in 2 g. portions until a TLC showed no more aldehyde to be present (total of 6 g. of $NaBH_4$ added) and a corresponding increase in the amount of the corresponding benzyl alcohol. The methanol was removed in vacuo and the residue taken up in 500 ml. of chloroform. This solution was washed several times with distilled water and the chloroform removed in vacuo. The remaining crystalline material was washed with n-hexane to yield 93 g. of the white crystalline product, 2-chloro-4-(2-diethylaminoethylamino)benzyl alcohol, m.p. 66.0–67.4° C. (corr.). A second crop weighing 13.5 g. was obtained from the mother liquor.

Analysis.—Calcd. for $C_{13}H_{21}ClN_2O$: N, 10.91. Found: N, 11.09.

Infrared spectral data of the above product show it to be identical with the product obtained by chemical methods as described hereinbelow, e.g., by reduction of ethyl 2-chloro - 4 - (2-diethylaminoethylamino)-benzoate (Example 3A) and by reduction of ethyl 2-chloro-4-(diethylaminoacetamido)benzoate (Example 4A).

Example 3

A. 2 - Chloro - 4 - (2-diethylaminoethylamino)benzyl alcohol—A solution of 2.5 g. of ethyl 2-chloro-4-(2-diethylaminoethylamino)benzoate in 35 ml. anhydrous ether was added to a slurry of 350 mg. lithium aluminum hydride in 75 ml. ether at room temperature. The reaction mixture was refluxed gently for thirty minutes, allowed to cool, and treated with an excess of 35% aqueous sodium hydroxide solution. The layers were separated and the aqueous layer extracted with ether. The ether extract was washed with water, dried over anhydrous $MgSO_4$, and concentrated to an oil weighing about 3 g. Chromatographic purification of the oil on a silica gel column (50 g., 2.5 x 25 cm.) developed with ether containing 5% triethylamine yielded one gram of material melting at 62–65° C. When recrystallized once from a benzene-n-hexane mixture, there was obtained 0.9 g. of 2-chloro-4-(2-diethylaminoethylamino)benzyl alcohol, m.p. 65.8–67.0° C. (corr.).

Analysis.—Calcd. for $C_{13}H_{21}ClN_2O$: N, 10.91; Cl, 13.81. Found: N, 10.84; Cl, 13.36.

Reaction of 2 - chloro-4-(2-diethylaminoethylamino) benzyl alcohol with acetic anhydride, propionic anhydride, benzoyl chloride, 3,5-dinitrobenzoyl chloride, 4-ethoxybenzoyl chloride or unsubstituted-phenyl isocyanate yields the following respective 2-chloro-4-(2-diethylaminoethylamino)benzyl esters; acetate, propionate, benzoate, 3,5-dinitrobenzoate, 4-ethoxybenzoate or carbanilate.

B. The above intermediate ethyl 2-chloro-4-(2-diethylaminoethylamino)benzoate was prepared as follows: Twenty-six grams of ethyl 4-amino-2-chlorobenzoate and 52 g. of freshly distilled 2-diethylaminoethyl chloride were heated in a sealed tube at 180–190° C. for fifteen minutes. The contents of the cooled tube were treated with 300 ml. of water and the mixture (pH of 5) was washed with ether. The aqueous layer was made strongly basic with aqueous sodium hydroxide solution and extracted with ether. The product was extracted from the ether layers with 10% acetic acid. The acidic extract was basified with aqueous sodium hydroxide and extracted with ether. The ether extract was washed with water, dried over anhydrous $MgSO_4$ and concentrated to an oil weighing 8 grams. The oil in anhydrous ether was passed through a silica gel column (100 g., 2.5 x 50 cm.) using additional ether as the eluant to yield 5 g. of oil which was dissolved in 100 ml. of boiling absolute ethanol and treated with 4.5 g. of picric acid. After cooling, the crystalline solid that separated was collected and recrystallized from absolute ethanol to yield 7 g. of ethyl 2-chloro-4-(2-diethylaminoethylamino)benzoate as its picrate, m.p. 149.5–150.5° C.

Analysis.—Calcd. for $C_{15}H_{23}ClN_2O_2 \cdot C_6H_3N_3O_7$: N, 13.27; Cl, 6.72. Found: N, 13.30; Cl, 6.98.

The picrate was decomposed with aqueous sodium hydroxide solution, the product extracted with ether, and the residue distilled to yield 2.5 g. of ethyl 2-chloro-4-(2-diethylaminoethylamino)benzoate, a light colored oil boiling at 190–194° C. at 0.5 mm.

Example 4

A. 2-Chloro - 4 - (2-diethylaminoethylamino)benzyl alcohol from ethyl 2-chloro-4-(diethylaminoacetamido)benzoate—A solution of 23.4 g. of aluminum chloride in 300 ml. of tetrahydrofuran was added all at once, but cautiously, to a mixture of 52 g. of lithium aluminum hydride in 2000 ml. of tetrahydrofuran and the mixture was cooled to −12° C. The free base from 117 g. of ethyl 2-chloro-4-(diethylaminoacetamido)benzoate hydrochloride was dissolved in 200 ml. of tetrahydrofuran and the solution was added with efficient stirring over a period of forty-five minutes to the solution of lithium aluminum hydride and aluminum chloride. The temperature during the addition was maintained at −12° C. to −8° C. using a mixture of solid carbon dioxide and acetone. The reaction was stirred for six hours at −12° C. to −6° C. and then carefully hydrolyzed with 165 ml. of 35% sodium hydroxide solution. In order to break the emulsion, 20 g. of finely ground potassium hydroxide was added. The mixture was filtered and the filter cake was washed twice with tetrahydrofuran. The filtrate was concentrated in vacuum. The residue, 84 g., was dissolved in 75 ml. benzene and then 100 ml. n-pentane was added. The resulting slightly yellow crystalline product was collected and found to weigh 44.5 g. (46%), m.p. 64–67° C. Recrystallization from benzene-n-pentane, using decolorizing charcoal, afforded 44 g. of 2-chloro-4-(2-diethylaminoethylamino)benzyl alcohol, m.p. 66–68° C.

Following the procedure of Example 4A using a molar equivalent quantity of the corresponding loweralkyl, e.g., ethyl, 2-halo-4-[di-(lower-alkyl)amino-acetylamino]benzoate, the following 2-halo-4-[2-di-(lower-alkyl)aminoethylamino]benzyl alcohols are obtained: halo is Br and lower-alkyl is ethyl; halo is Cl and lower-alkyl is n-butyl; halo is Cl and lower-alkyl is methyl; and halo is Cl and lower-alkyl is n-hexyl.

B. The intermediate ethyl 2-chloro-4-(diethylaminoacetamido)benzoate used in Example 4A was prepared as follows: A mixture of 133 g. of ethyl 2-chloro-4-(chloroacetamido)benzoate and 106 g. of diethylamine in 1 liter of dry benzene was refluxed for four hours. The reaction mixture was concentrated to about half of its volume and washed with water. The organic layer was extracted with dilute hydrochloric acid. After washing the acidic extracts with ether, the solution was basified and extracted with ether. The ether extracts were dried over anhydrous calcium sulfate and then concentrated. The residue was dissolved in isopropyl alcohol and the hydrochloride was prepared by adding one equivalent of concentrated hydrochloric acid, followed by ether until the solution was almost cloudy. After cooling, the crystalline product was collected to yield 144 g. (86%) of ethyl 2-chloro-4-(diethylaminoacetamido)benzoate hydrochloride, m.p. 150–151° C.

C. The intermediate ethyl 2-chloro-4-(chloroacetamido)benzoate used in Example 4B was prepared as follows: To a refluxing solution of 115 g. of ethyl 4-amino-2-chlorobenzoate in 350 ml. ethylene dichloride was added slowly a solution of 68 g. of chloroacetyl chloride dissolved in 210 ml. ethylene dichloride. The mixture was refluxed for ninety minutes and then diluted with 1 liter of n-pentane. After cooling in the refrigerator overnight, the precipitate was collected and washed well with n-pentane to yield 133 g. (83%) of ethyl 2-chloro-4-(chloroacetamido)benzoate, m.p. 119–122° C.

Example 5

A. 2-Chloro-4-(4-ethyl-1-piperazinyl)benzyl alcohol from 2-chloro-4-(4-ethyl-1-piperazinyl)benzaldehyde: To a solution containing 4.0 g. of 2-chloro-4-(4-ethyl-1-piperazinyl)benzaldehyde (see Example 5B) in 45 ml. of absolute ethanol was added 10 ml. of a 50% solution of sodium borohydride in ethanol. The resulting mixture was stirred at room temperature for one hour and then allowed to stand over the weekend. After removal of the alcohol by distillation in vacuo, 20 ml. of 20% aqueous sodium hydroxide solution was added and the resulting mixture was extracted three times with ether. The ether extract was dried over anhydrous magnesium sulfate and the ether removed to yield an oil which solidified on cooling. The solid was recrystallized twice from benzene-n-hexane, using decolorizing charcoal the second time, and dried at 75° C. for three hours at 20 mm. to yield 1.8 g. of 2-chloro-4-(4-ethyl-1-piperazinyl)benzyl alcohol, m.p. 96.8–99.0° C. (corr.).

Analysis.—Calcd. for $C_{13}H_{19}ClN_2O$: Cl, 13.91; N, 11.00. Found: Cl, 13.78; N, 11.05.

B. The above intermediate 2-chloro-4-(4-ethyl-1-piperazinyl)benzaldehyde was prepared as follows: To a solution under an atmosphere of nitrogen and containing 10.0 g. of sodium 5-nitro-o-toluenesulfonate, 1.6 g. of ammonium chloride and 40 ml. of distilled water was added 8 g. of zinc dust (90%) in two portions, while cooling the reaction mixture to keep the temperature below 70° C. The excess zinc dust was filtered off and washed with 25 ml. of water; 2.4 ml. of concentrated hydrochloric acid was added to the filtrate. The resulting solution was added to a solution obtained by dissolving 6.0 g. of 1-(3-chlorophenyl)-4-ethylpiperazine in a mixture of 4.0 ml. of concentrated hydrochloric acid and 0.5 ml. of water followed by addition of 2.3 ml. of 37% aqueous formaldehyde, the first solution being added to the second immediately after addition of the formaldehyde to form the second solution. The reaction mixture was then allowed to stand at room temperature for two days, 50 ml. of a saturated solution of sodium chloride in water was added, and the resulting mixture was neutralized to a pH of 6.8–7.0 with ammonium hydroxide, whereupon a gummy yellow precipitate separated. The residue was stirred in an ice bath for thirty minutes and the resulting gummy precipitate was collected. To the precipitate was added 50 ml. of water and 25 ml. of ammonium hydroxide, the mixture was heated below its boiling point for ten minutes, cooled and extracted four times with 100 ml. of ether. The ether extract was dried over anhydrous magnesium sulfate and the ether removed to yield, as a piscouse yellow oil, 4.0 g. of 2-chloro-4-(4-ethyl-1-piperazinyl)benzaldehyde. Infrared spectral analysis of this compound showed it to have a carbonyl group. Also, it was converted into its thiosemicarbazone, m.p. 223.0–223.5° C. (corr.) with decomposition.

Analysis.—Calcd. for $C_{14}H_{20}ClN_5S$: Cl, 10.88; S, 9.84. Found: Cl, 11.18; S, 9.46.

C. The intermediate 1-(3-chlorophenyl)-4-ethylpiperazine used in Example 5B was prepared as follows: A mixture containing 15 g. of 1-(3-chlorophenyl)piperazine, 6 ml. of ethyl bromide and 100 ml. of benzene was refluxed for three hours. The white solid [1-(3-chlorophenyl)piperazine hydrobromide] that separated was filtered off, 15 ml. of ethyl bromide was added to the filtrate and refluxing was continued for another four hours. The mixture was stirred at room temperature overnight and another 3.5 g. of 1-(3-chlorophenyl)piperazine hydrobromide was filtered off. The filtrate was concentrated in vacuo and the remaining oil was dissolved in anhydrous ether and filtered through infusorial earth (Super-Cel®). To the filtrate was added 7.9 ml. of 9.7 N ethanolic hydrogen chloride. The resulting white precipitate was collected, air-dried and recrystallized from about 400 ml. of acetone to yield 5.0 g. of 1-(3-chlorophenyl)-4-ethylpiperazine hydrochlorine, m.p. 206–208° C., after drying at 70° C. at 20 mm. for one hour. A second crop of 1.5 g., m.p. 208–209° C., was obtained by concentrating the filtrate to 100 ml. For analysis, a 0.5 g. sample of the first crop was placed in an oven at 70° C. and 20 mm. overnight.

Analysis.—Calcd. for $C_{12}H_{17}ClN_2 \cdot HCl$: N, 10.72. Found: N, 10.78.

Example 6

A. 2-Chloro-4-(2-diethylaminoethylamino)-3,5-dimethylbenzyl alcohol was prepared from 2-chloro-4-(2-diethylaminoethylamino)-3,5-dimethylbenzaldehyde following the procedure described in Example 5A using 7.5 g. of 2-chloro-4-(2-diethylaminoethylamino)-3,5-dimethylbenzaldehyde (Ex. 6B), 50 ml. of absolute ethanol and 1 g. of sodium borohydride. There was obtained 1 g. of an oily product which was dissolved in 5 ml. of absolute ethanol, and the solution treated with 0.4 g. of p-toluenesulfonic acid monohydrate followed by addition of 40 ml. of anhydrous ether. The solid that separated was collected to yield 0.90 g. of 2-chloro-4-(2-diethylaminoethylamino)-3,5-dimethylbenzyl alcohol as its di-(p-toluenesulfonate), m.p. 154.0–154.6° C. (corr.) with decomposition.

*Analysis.* — Calcd. for $C_{15}H_{25}ClN_2O \cdot 2C_7H_8O_3S$: C, 55.35; H, 6.57; N, 4.45; S, 10.19. Found: C, 55.15; H, 6.56; N, 4.22; S, 10.09.

B. The above intermediate 2-chloro-4-(2-diethylaminoethylamino) - 3,5 -dimethylbenzaldehyde was prepared following the procedure described in Example 5B using 25.0 g. of sodium 5-nitro-o-toluenesulfonate, 4.4 g. of ammonium chloride, 100 ml. of water, 20.0 g. of zinc dust (90%), 62 ml. of wash water, 4.4 ml. of concentrated hydrochloric acid, 22.0 g. of 3-(2-diethylaminoethylamino)-2,4-dimthylchlorobenzene, a mixture of 10 ml. of concentrated hydrochloric acid and 30 ml. of water, and 5.7 ml. of 37% formaldehyde solution. There was thus obtained, as an oil, 7.5 g. of 2-chloro-4-(2-diethylaminoethylamino)-3,5-dimethylbenzaldehyde.

C. The intermediate 3-(2-diethylaminoethylamino)-2,4-dimethylchlorobenzene used in Example 6B was prepared as follows: A mixture containing 22 g. of 3-chloro-2,6-dimethylaniline, 15.5 g. of freshly distilled 2-diethylaminoethyl chloride and 100 ml. of benzene was refluxed for twenty-seven hours. The reaction mixture was concentrated *in vacuo* and the viscous oily residue was heated at 100° C. and 0.1 mm. To the residue was added about 400 ml. of ether and the mixture was cooled in a bath of solid carbon dioxide and acetone, whereupon the gummy product solidified. The solid was collected and recrystallized from isopropyl alcohol-ether to yield 5.4 g. of 3-(2-diethylaminoethylamino) - 2,4 - dimethylchlorobenzene, m.p. 104–106° C.

*Analysis.*—Calcd. for $C_{14}H_{23}ClN_2$: N, 9.62. Found: N, 9.58.

D. 2-Chloro-4-(2-diethylaminoethylamino)-benzyl alcohol (0.8 g., m.p. 64.0–65.5° C.) was obtained from 2-chloro-4-(2-diethylaminoethylamino)benzaldehyde (3 g.) following the procedure described above in Example 6A using 15 ml. of methanol and 1 g. of sodium borohydride.

Example 7

Fermentative enzymatic oxidation of 2-chloro-4-(2-diethylaminoethylamino)-3,5-dimethyltoluene to 2-chloro-4-(2-diethylaminoethylamino) - 3,5 - dimethylbenzyl alcohol was carried out following the procedure described in Example 2 using 6.5 g. of 2-chloro-4-(2-diethylaminoethylamino)-3,5-dimethyltoluene hydrochloride and a reaction period of three days, all other reaction conditions being the same as in Example 2. The product was isolated as follows: The oily residue after evaporation of the methylene dichloride was mixed with 30 g. of silica gel and placed on a 150 g. silica gel column (3.7 x 21 cm.) and the column was developed using increasing amounts of ether in n-hexane and finally with increasing amounts of methanol in ether, all solvents containing 0.5% triethylamine. The fractions collected with 99.5% ether and 0.5% triethylamine were combined and evaporated to yield, as an oil, 2-chloro-4-(2-diethylaminoethylamino)-3,5-dimethylbenzyl alcohol.

Example 8

3-Chloro - N - (2-diethylaminoethyl)-4-methoxymethyl-2,6-dimethylaniline—When 2 - chloro-4-(2-diethylaminoethylamino) - 3,5 - dimethylbenzyl alcohol (152 g.) dissolved in ethanol (150 ml.) was mixed with p-toluenesulfonic acid monohydrate (128 g.) in ethanol (400 ml.), there separated a white crystalline precipitate of 2-chloro-4 (2-diethylaminoethylamino)-3,5-dimethylbenzyl alcohol di-(p-toluenesulfonate). When the latter was dissolved in boiling absolute methanol, the hot solution treated with decolorizing charcoal and filtered, and the filtrate allowed to cool, there separated 3-chloro-N-(2-diethylaminoethyl)-4-methoxymethyl - 2,6 - dimethylaniline di-(p-toluenesulfonate) (119 g.), m.p. 153.0–155.8° C. (corr.) with decomposition.

*Analysis.*—Calcd. for $C_{16}H_{27}ClN_2O \cdot 2C_7H_8O_3S$: S, 9.97; Cl, 5.56. Found: S, 10.21; Cl, 5.61.

3-Chloro-N-(2-diethylaminoethyl) - 4 - methoxymethyl-2,6-dimethylaniline in free base form was obtained by dissolving its di-(p-toluenesulfonate) in water, making the aqueous solution alkaline with aqueous sodium hydroxide solution, extracting the free base form with methylene dichloride, removing the methylene dichloride, and drying *in vacuo* at 65° C.

Following the foregoing procedure using, in place of boiling methanol, boiling n-propanol, n-butanol or n-hexanol to dissolve the 2-chloro-4-(2-diethylaminoethylamino) - 3,5 - dimethylbenzyl alcohol di - (p - toluenesulfonate), there is obtained the following ethers first in the form of their di(p-toluenesulfonates) and then in their free base forms: 3 - chloro - N - (2 - diethylaminoethyl)-2,6-dimethyl-4-n-propoxymethylaniline, 4-n-butoxymethyl-3-chloro - N - (2 - diethylaminoethyl)-2,6-dimethylaniline or 3 - chloro - N - (2 - diethylaminoethyl) - 4-n-hexoxymethyl - 2,6 - dimethylaniline, respectively. Similarly, following the above procedure using, in place of 2-chloro-4-(2 - diethylaminoethylamino) - 3,5 - dimethylbenzyl alcohol, 2-chloro-4-(2 - diethylaminoethyl)benzyl alcohol, 2 - chloro - 4(4 - allyl - 1 - piperazinyl)benzyl alcohol or 2-chloro-4-(4-methyl - 1 - piperazinyl)benzyl alcohol, there is obtained first the respective benzyl alcohols as their di-(*p*-toluenesulfonates) and then, after treatment of the latter with boiling methanol, the following methyl ethers, first in the form of their di-(*p*-toluenesulfonates) and then in their free base forms: 3-chloro-N-(2-diethylaminoethyl) - 4 - methoxymethylaniline, 4-allyl-1-(3-chloro - 4 - methoxymethylphenyl)piperazine of 1-(3-chloro-4-methoxymethylphenyl) - 4 - methylpiperazine, respectively.

Example 9

3-Chloro-4-ethoxymethyl - N - (2-diethylaminoethyl)-2,6-dimethylaniline was obtained following the procedure described in Example 8 using boiling ethanol instead of boiling methanol. Thus, from 1 g. of 2-chloro-4-(2-diethylaminoethylamino)-3,5-dimethylbenzyl alcohol and 1.2 g. *p*-toluenesulfonic acid monohydrate, there was obtained 1.5 g. of 3-chloro-4-ethoxymethyl-N-(2-diethylaminoethyl) - 2,6 - dimethylaniline di-(*p*-toluenesulfonate), m.p. 140–142° C.

*Analysis.*—Calcd. for $C_{17}H_{29}ClN_2O \cdot 2C_7H_8O_3S$: Cl, 5.39; N, 4.26. Found: Cl, 5.49; N, 4.10.

Example 10

Fermentative enzymatic oxidation of 2-chloro-4-(diethylaminoacetylamino) - 3,5 - dimethyltoluene(14 g.) to 2-chloro-4-(diethylaminoacetylamino)-3,5 - dimethylbenzyl alcohol was carried out following the procedure described in Example 2 using a reaction period of two weeks, a conversion temperature of 28–29° C., an agitation rate of 400 r.p.m., an aeration rate of 4 liters per minute, and 100 ml. of 10N sodium hydroxide solution to terminate the fermentation. The residue after evaporation of the methylene dichloride was dissolved in 150 ml. of a mixture of nine parts (by volume) of methanol and one part of water and the solution extracted with n-hexane. The methanol-water phase was evaporated *in vacuo* and dried to a thick oily residue which was dissolved in ether. The ether solution was treated with decolorizing charcoal, filtered and the filtrate cooled. The crystalline precipitate that separated was collected and purified by recrystallization from ethyl acetate-ether to yield 3.7 g. of 2-chloro-4-

(diethylaminoacetylamino) - 3,5 - dimethylbenzyl alcohol, m.p. 139–140° C.

*Analysis.*—Calcd. for $C_{15}H_{23}ClN_2O_2$: Cl, 11.87; N, 9.38. Found: Cl, 11.71; N, 9.37.

Following the reductive procedure of Example 4A 2-chloro-4-(diethylaminoacetylamino)-3,5 - dimethylbenzyl alcohol is reduced to yield 2-chloro-4-(diethylaminoethylamino)-3,5-dimethylbenzyl alcohol.

When tested for local anesthetic activity by the standard intradermal injection method in guinea pigs, 2-chloro-4-(diethylaminoacetylamino)-3,5 - dimethylbenzyl alcohol was found to produce average durations of anesthesia of 11 and 14 minutes at dose concentrations of 0.4 and 0.8% respectively.

Following the procedure described above in Example 10 using the appropriate 4-(aminoacetylamino)-2-halotoluene in place of 2-chloro-4-(diethylaminoacetylamino)-3,5-dimethyltoluene, there are obtained the following corresponding 4-(aminoacetylamino)-2-halobenzyl alcohols: 2-chloro-4-(diethylaminoacetylamino)benzyl alcohol, 2-bromo-4-(diethylaminoacetylamino)benzyl alcohol, 2-chloro-4-(ethylaminoacetylamino)benzyl alcohol, 2-chloro-4-(1-piperidinylacetylamino)benzyl alcohol or 2-chloro-4-(dimethylacetylamino)benzyl alcohol. Reduction of these compounds as in Example 10 yields, respectively: 2-chloro - 4 - (2-diethylaminoethylamino)benzyl alcohol, 2-bromo-4-(2-diethylaminoethylamino)benzyl alcohol, 2-chloro-4-(2-ethylaminoethylamino)benzyl alcohol, 2-chloro-4-[2-(1-piperidinyl)ethylamino]benzyl alcohol or 2-chloro-4-(2-dimethylaminoethylamino)benzyl alcohol.

The foregoing intermediate 4-(aminoacetylamino)-2-halotoluenes are prepared from the corresponding known 4-amino-2-halotoluenes by reacting the latter with chloroacetyl chloride to form the corresponding 4-(chloroacetylamino)-2-halotoluenes which are then reacted with the appropriate amine, e.g., diethylamine, to form the corresponding 4-(aminoacetylamino) compounds, e.g., 4-(diethylaminoacetylamino)-2-halotoluenes using diethylamine. The preparation of these intermediates is illustrated as follows for the preparation of 2-chloro-N-(diethylaminoacetyl)-3,5-dimethyltoluene from 3-chloro-2,4,6-trimethylaniline: To a stirred refluxing solution of 8 g. of 3-chloro-2,4,6-trimethylaniline in 25 ml. of ethylene dichloride was added dropwise a solution of 5.46 g. of chloroacetyl chloride in 15 ml. of ethylene dichloride. The resulting reaction mixture was refluxed with stirring for three hours, cooled, diluted with 100 ml. of n-pentane, and stirred cold for 30 minutes. The resulting precipitate was collected, washed with n-pentane, recrystallized from absolute ethanol-n-pentane and dried *in vacuo* at 60° C. to yield 7.8 g. of 2-chloro-4-(chloroacetylamino)-3,5-dimethyltoluene, m.p. 167–168° C. A mixture of said 4-(chloroacetylamino) compound with 6.94 g. of diethylamine and 75 ml. of benzene was refluxed for four hours, concentrated to about one-half the original volume, washed with water and extracted with dilute aqueous hydrochloric acid. The acidic extract was washed with ether, made basic with concentrated ammonium hydroxide and extracted with ether. The ether extract was dried over anhydrous sodium sulfate, and heated *in vacuo* to remove the ether, thereby leaving 8.7 g. of 2-chloro-4-(diethylaminoacetylamino)-3,5-dimethyltoluene. A solution of this compound in isopropyl alcohol was treated with 2.59 ml. of concentrated hydrochloric acid in isopropyl alcohol, the reaction mixture warmed and then allowed to cool, whereupon the white hydrochloride separated. The mixture was diluted with absolute ether and the precipitate was collected, recrystallized from absolute ethanol-ether, dried *in vacuo* at 60° C. to yield 6.0 g. of 2 - chloro - 4 - (diethylaminoacetylamino)-3,5-dimethyltoluene as its hydrochloride, m.p. 150.0–154.0° C. (corr.). [*Analysis.*—Calcd. for $C_{15}H_{23}ClN_2O \cdot HCl$: Cl, 22.1; N, 8.77. Found: Cl, 22.39; N, 8.80]. The following intermediate 4-(aminoacetylamino)-2-halotoluenes are similarly prepared in two steps using the appropriate 4-amino-2-halotoluene, chloroacetyl chloride and tertiary- or secondary-amine: 2-chloro-4-(diethylaminoacetylamino)toluene, 2-bromo-4-(diethylaminoacetylamino)toluene, 2-chloro-4-(ethylaminoacetylamino)toluene, 2-chloro-4-(1-piperidinylacetylamino)toluene and 2-chloro-4-(dimethylaminoacetylamino)toluene.

Example 11

2 - Chloro-4-(2-diethylaminoethylamino)-3,5-dimethylbenzyl alcohol as its cyclohexanesulfamate was prepared by adding a solution of 4.45 g. of N-cyclohexylsulfamic acid in 45 ml. of acetone to a solution of 7.1 g. of said benzyl alcohol in 50 ml. of acetone whereupon the salt crystallized immediately, cooling the mixture to 5° C., collecting the precipitate, washing it with a little acetone and ether, and drying it *in vacuo* at 70° C. to yield 10.5 g. of said cyclohexanesulfamate, m.p. 135° C.

*Analysis.*—Calcd. for $C_{15}H_{25}ClN_2O \cdot C_6H_{13}NO_3S$: Cl, 7.65; N, 9.06. Found: Cl, 7.75; N, 8.91.

Example 12

3 - Chloro-N-(2-diethylaminoethyl)-4-isopropoxymethyl-2,6-dimethylanailine di-(p-toluenesulfonate) was prepared from the corresponding 4-methoxymethyl compound (Example 8) as follows: A solution containing 10 g. of 3-chloro-N-(2-diehylaminoethyl)-4-methoxymethyl-2,6-dimethylaniline di-(p-toluenesulfonate) in 100 ml. of hot isopropyl alcohol was refluxed for thirty minutes and then concentrated by boiling to about 25 ml. To the concentrated solution was added ether whereupon a pale yellow solid separated. The mixture was allowed to cool and the solid collected and dried *in vacuo* over phosphorus pentoxide at 70° C. for sixteen hours to yield 9.13 g. of 3-chloro-N-(2-diethylaminoethyl)-4-isopropoxymethyl-2,6-dimethylaniline di-(p - toluenesulfonate), m.p. 123–125° C.

EXAMPLE 13

Fermentative enzymatic oxidation of 2-chloro-4-[(2-diethylaminoethyl)methylamino]toluene hydrochloride (33 g.) to 2-chloro-4-[(2-diethylaminoethyl)methylamino]benzyl alcohol hydrochloride (7.5 g.) was carried out following procedure described in Example 2 using a reaction period of four days, a conversion temperature of 30° C., an agitation rate of 450 r.p.m., an aeration rate of five liters per minute, 100 ml. of 10N sodium hydroxide solution to terminate the fermentation, and two 20 l. portions of methylene dichloride to extract the product, which was isolated from the extract as follows: The residue after evaporation of the methylene dichloride was taken up with a mixture of 300 ml. of methanol and 30 ml. of water, the solution filtered and the filtrate extracted with n-hexane. The methanol solution was concentrated *in vacuo* to remove the methanol, the concentrate treated with a small quantity of benzene, and the benzene removed *in vacuo* to remove any remaining water. The resulting yellow oil, which included both 2-chloro-4 - [(2 - diethylaminoethyl)methylamino]benzyl alcohol and a small amount of the corresponding 2-chloro - 4-[(2 - diethylaminoethyl)methylamino]benzaldehyde, was treated with 200 ml. of methanol plus sodium borohydride (about 1 g.) until a TLC analysis indicated no benzaldehyde product present. The methanol was removed *in vacuo* and the mixture dissolved in 300 ml. of methylene dichloride. The methylene dichloride solution was washed with three 100 ml. portions of water, dried over anhydrous sulfate and concentrated *in vacuo* to remove the methylene dichloride, thereby yielding about 44 g. of a yellow oily product. A 5 g. portion of the oily product in methylene dichloride solution was applied to ten 20 x 40 cm. silica gel plates (1 mm. in thickness) and the plates were developed in ethyl acetate (9):triethylamine (1). The material from the ultraviolet-absorbing bands containing the desired benzyl alcohol product (more polar than the starting toluene derivative) was eluted with about 450 ml. of chloroform. The chloroform was washed with 200 ml. of water made alkaline with 1 ml. of 10N sodium hydroxide solution. The chloroform solution was dried over anhydrous sodium sulfate, filtered and concentrated *in vacuo* to yield, as a pale yellow oil, 3.7 g. of 2-chloro-[(2-diethylaminoethyl) methylamino]benzyl alcohol. An additional 5 g. of the above oil was applied to ten silica gel plates as above and the resulting product was combined with the 3.7 g. of product to yield a total of 8 g. of 2-chloro-4-[(2-diethylaminoethyl)methylamino]benzyl alcohol. This product was dissolved in 300 ml. of tetrahydrofuran and the solution treated dropwise with 9.4 ml. of 6.3N ethereal hydrogen chloride. The resulting white crystalline precipitate was collected and dried *in vacuo* at room temperature for about fifteen minutes and then *in vacuo* at 60° C. over phosphorus pentoxide to yield 7.5 g. of 2-chloro-4-[(2 - diethylaminoethyl)methylamino]benzyl alcohol hydrochloride, m.p. 135–136° C.

Following the procedure described in Example 1 using the appropriate 4-[amino-(polycarbon - lower-alkyl)-amino]-2-halotoluene, the corresponding 4-[amino-(polycarbon-lower-alkyl)amino]-2-halobenzyl alcohols are obtained, as illustrated, without limiting the foregoing, by the compounds of Table B.

TABLE B

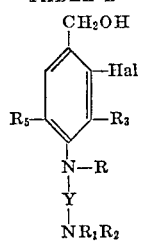

| No. | Hal | R | Y—NR₁R₂ | R₃ | R₅ |
|---|---|---|---|---|---|
| 1 | Br | H | (CH₂)₂N(C₂H₅)₂ | H | H |
| 2 | I | H | (CH₂)₂NHC₃H₇—n | C₂H₅ | C₂H₅ |
| 3 | F | H | (CH₂)₃N(CH₃)₂ | CH₃ | H |
| 4 | Cl | CH₃ | (CH₂)₂N(C₂H₅)₂ | H | CH₃ |
| 5 | Cl | H | CH(CH₃)CH₂N(CH₃)₂ | H | H |
| 6 | Cl | H | (CH₂)₆N(C₂H₅)₂ | H | H |
| 7 | Cl | H | (CH₂)₂NHCH₂CH₂OH | H | H |
| 8 | Cl | H | (CH₂)₂N(CH₂CH₂OH)₂ | H | H |
| 9 | Cl | H | (CH₂)₂NH₂ | H | H |
| 10 | Cl | H | (CH₂)₂NHCH₂CH=CH₂ | H | H |
| 11 | Cl | H | (CH₂)₂N(C₆H₁₃—n)₂ | H | H |
| 12 | Cl | H | CH₂CH₂N(CH₂CH₂OH)(C₂H₅) | H | H |
| 13 | Cl | H | CH₂CH₂NC₅H₁₀ ᵃ | H | H |
| 14 | Cl | H | (CH₂)₃NC₄H₈ ᵇ | H | H |
| 15 | Cl | H | (CH₂)₂NC₄H₈O ᶜ | H | H |
| 16 | Cl | H | (CH₂)₂NC₆H₁₂ ᵈ | H | H |
| 17 | Cl | H | (CH₂)₂NC₆H₁₂ ᵉ | H | H |
| 18 | Cl | H | (CH₂)₂NC₇H₁₄ ᶠ | H | H |
| 19 | Cl | H | (CH₂)₂N(C₂H₅)(CH₂C(CH₃)₂OH) | H | H |
| 20 | Cl | H | (CH₂)₂NC₄H₈NCH₃ ᵍ | H | H |
| 21 | Cl | H | (CH₂)₂NH(CH₂)₆OH | H | H |
| 22 | Cl | H | (CH₂)₂NHCH₂CH(CH₃)=CH₂ | H | H |

ᵃ NC₅H₁₀≡piperidino.
ᵇ NC₄H₈≡pyrrolidino.
ᶜ NC₄H₈O≡morpholino.
ᵈ NC₆H₁₂≡hexamethyleneimino.
ᵉ NC₆H₁₂≡2,5-dimethylpyrrolidino.
ᶠ NC₇H₁₄≡2,6-dimethylpiperidino.
ᵍ NC₄H₈NCH₃≡4-methylpiperazino.

The 4-[amino-(polycarbon-lower-alkyl)-amino]-2-halobenzyl alcohols of Table B also can be prepared by following the procedure described in Example 3A using a corresponding molar equivalent quantity of the appropriate ethyl or other lower-alkyl 4-[amino-(polycarbon-lower-alkyl)-amino]-2-halobenzoate or by following the procedure described in Examples 5A or 6A using a corresponding molar equivalent quantity of the appropriate 4-[amino-(polycarbon - lower-alkyl)-amino]-2-halobenzaldehyde. The 4-aminoethylamino-2-halobenzyl alcohols of Table B, i.e., Compound Numbers 1, 2, 4, 7–13 and 15–22, also can be prepared by following the procedure described in Example 4A by reducing the corresponding ethyl 4-amino-acetylamino-2-halobenzoate, which in turn can be prepared by following the procedure of Example 4B using ethyl 2-chloro-4-(chloroacetamido)benzoate and appropriate amine or ammonia (for No. 9).

The 4-[amino-(polycarbon - lower - alkyl)-amino]-2-halobenzyl alcohols and lower-alkyl ethers of our invention when administered orally to hamsters and Swiss mice infested with *Schistosoma mansoni* were found to clear completely the animals of the parasitic infection at varying dose levels of compound per kg. of body weight per day for five consecutive days. Some of the most active embodiments have ED₅₀ values below 20 mg. per kg. of body weight, ED₅₀ meaning the effective dose necessary to clear 50% of the hamsters or mice (at least 5 animals at each of three or more dose levels) of the amebic infection. Generally, our 4-[amino - (polycarbon-lower-alkyl)-amino]-2-halobenzyl alcohols and ethers have greater activity in hamsters and have greater or approximately the same activity in mice when compared with the corresponding heretofore known 4-[amino-(polycarbon-lower-alkyl)-amino]-2-halotoluenes. Also, our benzyl alcohols were generally less toxic than the corresponding known toluene derivatives when determined by standard procedures in Swiss mice. Illustrative of the schistosomacidal activity of our compounds when determined as described above are the following data: 2-chloro-4-(2-diethylaminoethylamino)benzyl alcohol, oral ED₅₀ values of 9.0±2.4 mg./kg./day and 15.0±2.8 mg./kg./day in hamsters and Swiss mice, respectively, compared with respective values of 45±16.6 mg./kg./day and 13.0±2.7 mg./kg./ day for the corresponding toluene derivative, i.e., 2-chloro - 4 - (2-diethylaminoethylamino)toluene (HCl salt); 2-chloro - 4 - (2-diethylaminoethylamino)-3,5-dimethylbenzyl alcohol di-(p-toluenesulfonate), oral ED₅₀ of 3.7±2.0 mg./kg./day in Swiss mice; 3-chloro-N-(2-diethylaminoethyl) - 4 - methoxymethyl-2,6-dimethylaniline di-(p-toluenesulfonate), oral ED₅₀ of 3.4±0.5 mg./kg./day in Swiss mice; 3-chloro-4-ethoxymethyl-N-(2-diethylaminoethyl)-2,6-dimethylaniline di-(p - toluenesulfonate), oral ED₅₀ of about 12.5 mg./kg./day in hamsters. Illustrative of the toxicity of our compounds are the following acute intravenous LD₅₀ values in Swiss mice, LD₅₀ meaning the dose lethal to 50% of the mice (10 mice tested at each of three dose levels): 2-chloro-4-(2-diethylaminoethylamino)benzyl alcohol, LD₅₀ of 51±2 mg./kg., compared with 33±2.2 mg./kg. for the corresponding 2-chloro-4-(2-diethylaminoethylamino)toluene.

The subject matter which the applicants regard as their invention is particularly pointed out and distinctly claimed as follows:

1. A compound of the formula:

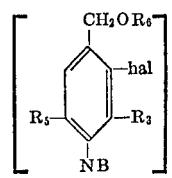 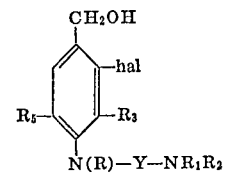

where hal is halo; R₃ and R₅ are each hydrogen or lower-alkyl; R is hydrogen of lower-alkyl; Y is polycarbon-lower-alkylene having from two to six carbon atoms inclusive and having its connecting linkages on different carbon atoms; R₁ and R₂ are each hydrogen, lower-alkyl, lower-alkenyl having from three to six carbon atoms or lower-hydroxyalkyl having from two to six carbon atoms and having its connecting linkage and the hydroxyl group on different carbon atoms; lower-alkyl in each instance having from one to six carbon atoms and being primary or secondary.

2. A benzyl alcohol according to claim 1 where $R_6$ is hydrogen, NB is NH—Y—$NR_1R_2$, Y is polycarbon-lower-alkylene as defined in claim 1, and $R_1$ and $R_2$ are each lower-alkyl.

3. A-Chloro - 4 - (2-diethylaminoethylamino)benzyl alcohol according to claim 2.

4. 2-Chloro - 4 - (2-diethylaminoethylamino)-3,5-dimethylbenzyl alcohol according to claim 2.

5. 2-Chloro - 4 - [(2-diethylaminoethyl)methylamino]benzyl alcohol according to claim 1.

References Cited
UNITED STATES PATENTS
3,714,046  1/1973  Adams et al. _____ 260—570.5 X ROBERT V. HINES, Primary Examiner U.S. Cl. X.R.

195—51 (R); 260—239 (G), 247.5 (R), 268 (C), (PH), 293.79, 326.5 (L), 471 (C), 501.12, 501.17, 501.19, 562 (N); 424—248, 250, 253, 267, 274, 316, 320, 330